United States Patent
Symanow

(10) Patent No.: US 9,796,291 B1
(45) Date of Patent: Oct. 24, 2017

(54) LOW CHARGE ACCEPTANCE MITIGATION USING A TRACTION BATTERY

(71) Applicant: Ford Global Technologies, LLC, Dearborn, MI (US)

(72) Inventor: David Anthony Symanow, Plymouth, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/347,088

(22) Filed: Nov. 9, 2016

(51) Int. Cl.
   *B60L 11/18* (2006.01)
   *H01M 10/42* (2006.01)

(52) U.S. Cl.
   CPC ....... *B60L 11/1862* (2013.01); *B60L 11/1864* (2013.01); *H01M 10/425* (2013.01); *H01M 2010/4271* (2013.01); *H01M 2220/20* (2013.01); *Y10S 903/907* (2013.01)

(58) Field of Classification Search
   CPC ............ B60L 11/1862; B60L 11/1864; H01M 10/425; H01M 2010/4271; H01M 2220/20; Y10S 903/907
   USPC .......................................................... 701/22
   See application file for complete search history.

(56) References Cited

U.S. PATENT DOCUMENTS

| | | | |
|---|---|---|---|
| 5,656,920 A * | 8/1997 | Cherng | B60L 11/1857 320/161 |
| 5,828,201 A * | 10/1998 | Hoffman, Jr. | H02J 7/0075 320/104 |
| 5,869,950 A * | 2/1999 | Hoffman, Jr. | B60K 6/28 320/103 |
| 6,037,751 A | 3/2000 | Klang | |
| 6,359,441 B1 * | 3/2002 | Bertness | G01R 31/3631 324/426 |
| 6,586,913 B2 * | 7/2003 | Rolfes | H02J 7/1446 320/139 |
| 7,619,417 B2 * | 11/2009 | Klang | G01R 31/3648 320/132 |
| 2003/0094927 A1 * | 5/2003 | Pavlovic | H02J 7/0075 320/162 |
| 2013/0054072 A1 | 2/2013 | Christen et al. | |
| 2014/0111139 A1 * | 4/2014 | Chen | H01F 27/28 320/107 |
| 2015/0061550 A1 * | 3/2015 | Schulz | H02P 3/14 318/376 |

(Continued)

FOREIGN PATENT DOCUMENTS

FR   2977325 A1   1/2013

*Primary Examiner* — Tyler J Lee
(74) *Attorney, Agent, or Firm* — James Dottavio; Brooks Kushman P.C.

(57) ABSTRACT

A controller may include input channels configured to receive charge acceptance values of an auxiliary battery and an SOC of a traction battery. The controller may also include output channels configured to provide threshold signals to set a voltage threshold of an auxiliary bus coupled with the auxiliary battery and deriving power from the traction battery. The controller may include control logic configured to generate the threshold signals such that during a next charging event, a voltage of the auxiliary battery achieves a desulfation value. The controller logic may generate the threshold signals in response to the acceptance falling below a predetermined sulfation value and the SOC being above an SOC threshold.

20 Claims, 6 Drawing Sheets

(56) References Cited

U.S. PATENT DOCUMENTS

2016/0089994 A1* 3/2016 Keller .................. H02J 7/045
                                                          320/153
2016/0090001 A1* 3/2016 Nomoto ................ B60L 1/003
                                                          320/109
2016/0355098 A1* 12/2016 Sakakibara ......... B60L 11/1861

* cited by examiner

LOW CHARGE ACCEPTANCE MITIGATION USING A TRACTION BATTERY

TECHNICAL FIELD

The present disclosure relates to low charge acceptance mitigation using a traction battery.

BACKGROUND

Charge acceptance is the ratio between charge received by the battery over time and charge retained by the battery. Charge acceptance is synonymous with battery charging efficiency. Low charge acceptance can noticeably degrade fuel economy in hybrid and electric vehicles because more energy is required to maintain a battery state of charge (SOC). Batteries having low charge acceptance may also require longer charging periods. As such, low charge acceptance can cause unnecessary consumption of fossil fuels.

SUMMARY

A controller may include input channels configured to receive a charge acceptance value of an auxiliary battery and an SOC of a traction battery. The controller may also include output channels configured to provide threshold signals to set a voltage threshold of an auxiliary bus coupled with the auxiliary battery and deriving power from the traction battery. The controller may include control logic configured to generate the threshold signals such that during a next charging event, a voltage of the auxiliary battery achieves a desulfation value. The control logic may generate the threshold signals in response to the value falling below a predetermined sulfation value and the SOC being above an SOC threshold.

A method may include receiving a charge acceptance value of an auxiliary battery and a traction battery SOC. The method may also include generating voltage threshold signals such that during a next charging event a voltage of an auxiliary battery achieves a stratification value. The generation may be in response to the value falling below a predetermined stratification value. The method may also include setting the threshold of an auxiliary bus coupled with the auxiliary battery deriving power from the traction battery when the SOC is above an SOC threshold.

A vehicle may include a controller having input channels configured to receive a charge acceptance value related to an auxiliary battery and an SOC of a traction battery. The controller may also include output channels configured to provide threshold signals to set a voltage threshold of an auxiliary bus coupled with the auxiliary battery deriving power from the traction battery. The controller may include control logic configured to generate the threshold signals such that during a next charging event, a voltage of the auxiliary battery achieves a stratification value. The threshold may be generated in response to the charge acceptance value falling below a predetermined stratification value and the SOC being above an SOC threshold. The controller may include control logic configured to generate threshold signals such that the voltage of the auxiliary battery falls below the stratification value in response to the charge acceptance value exceeding the predetermined stratification value during the event. The controller may include logic configured to generate the threshold signals such that during a next charging event, a voltage of the auxiliary battery achieves a desulfation value in response to the acceptance falling below a predetermined sulfation value and being above the predetermined stratification value. The controller may include logic configured to generate threshold signals such that the voltage of the auxiliary battery falls below the desulfation value in response to the charge acceptance value exceeding the predetermined sulfation value during the event.

DETAILED DESCRIPTION

Figure 1:
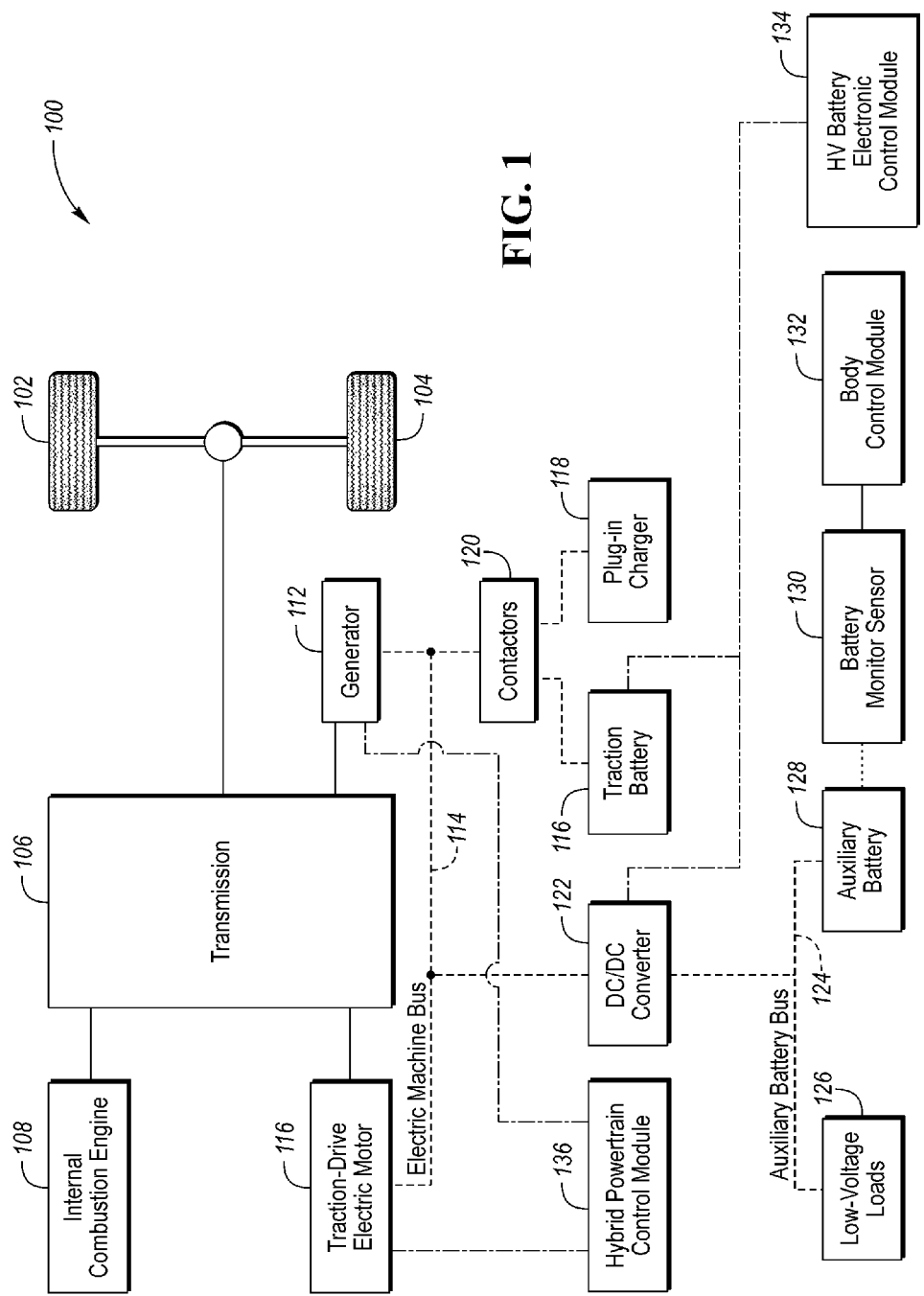
FIG. 1 is a vehicle overview of a typical hybrid vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include a variety of battery systems to provide electricity on demand. Hybrid vehicles may include traction batteries to provide power to traction motors and receive electricity from a utility connection or a generator. Hybrid vehicles may also include auxiliary batteries to provide power to auxiliary loads. A 12-volt bus, commonly found on most contemporary vehicles, may supply power to the auxiliary loads (e.g., electronics, defrost, temperature conditioning of seats). The 12-volt bus, however, may be configured as other voltages capable of supplying auxiliary loads. The auxiliary battery is typically a 12-volt, lead-acid battery. Any battery type is contemplated in this disclosure (e.g., Lithium, Nickel, Lead). The battery may be formed from lead-acid cells because lead-acid cells have a propensity for sulfation and stratification, which may lead to low charge acceptance.

Lead-acid batteries in motor vehicles may have six individual cells, each being capable of generating about two volts. Structuring the cells in series produces a 12-volt power source. The 12-volt power source may be collectively charged at a higher voltage between 13 and 14 volts. Higher charging voltages may cause off-gassing, which is a release of hydrogen from the battery. Off-gassing may reduce battery longevity.

Sulfation develops when a lead-acid battery is deprived of full charge. Sulfate crystals may form on the plates of each cell reducing the cell's active material. The reduction in active material reduces the charge acceptance of the battery. Sulfation can be corrected by increasing the charging voltage of a 12-volt battery bus to about 15.5 volts, resulting in each cell of the battery being charged near 2.58 volts. The increase in voltage may dissolve a substantial portion of the sulfate crystals. Sulfation may be recognized when the charge acceptance is between 25-50%, independent of temperature effects.

Stratification develops when the electrolyte of a battery is unevenly distributed to particular sectors of the battery. For example, the electrolyte may concentrate in the bottom of the battery cell, inhibiting the batteries ability to accept and store charge. Batteries may be destratified by applying a higher charging voltage to the battery bus. The higher voltage mixes the electrolyte through electrolysis. For example, a 12-volt battery may be charged near 16 volts, resulting in each cell being charged near 2.66 volts. Stratification may be determined when the charge acceptance is a fraction of a percent, independent of temperature effects.

Low charge acceptance may be caused by battery temperature. Low temperature ambient conditions may cause the charge acceptance to drop. In some embodiments, temperature effects may be removed from charge acceptance calculations. In this way, the chemistry-based low charge acceptance effects and temperature-based low charge acceptance effects are isolated, providing mitigation of only chemistry related low charge acceptance. Temperature effects may be removed using a lookup table or other method. For example, a characteristic association may be tracked by the manufacturer over various temperatures. A lookup table may allow the control logic to increase the charge acceptance proportionately or by another factor to remove temperature effects.

Low charge acceptance mitigation may be performed to improve charging efficiency, which may lower charge cycle times and improve vehicle fuel economy. The mitigation technique may be performed on a recurring, scheduled basis. A vehicle controller may be configured to mitigate low charge acceptance every thirty or sixty days. Although effective, the scheduled mitigation technique may result in low charge acceptance being unrefuted for long periods. For this or other reasons, a vehicle controller may be programmed to recognize low charge acceptance and raise the vehicle bus voltage to address low charge acceptance upon the occurrence or shortly thereafter. The controller may calculate charge acceptance after every charging cycle or set of charge cycles to determine whether sulfation or stratification is present. The controller may set a flag to mitigate low charge acceptance on a subsequent charging cycle. The controller may also perform on-the-fly mitigation if the battery is not entirely charged and low charge acceptance is detected.

In some instances, the controller may be programmed to mitigate sulfation during an active or key-on vehicle mode. The controller may be programmed to mitigate stratification during an inactive or key-off vehicle event or mode. Fluctuations in bus voltage during vehicle operation may deem high bus voltages, such as those required for destratification, unavailable. Therefore, modern auxiliary bus configurations may impose maximum bus voltage thresholds to ensure proper function of the auxiliary loads.

A traction battery of the vehicle may provide the energy required for the low charge acceptance mitigation to take place. For example, the energy from the traction battery may be controlled using a voltage regulator or DC/DC converter. The converter may buck voltage from the traction battery for the auxiliary voltage bus and battery. The converter may reduce the high voltage of the traction battery. The traction battery may be used following a vehicle key-off event because ambient temperatures of the batteries may be high. High ambient temperatures, especially surrounding the lead-acid, low-voltage battery, can ensure charge acceptance is not disparaged by low-temperature effects. Low temperatures may reduce the charge acceptance or efficiency of the energy transfer. Therefore, the auxiliary battery may be charged during chemical degradation times only, instead of both chemical and temperature degradation.

A vehicle key-off may be any circumstance where the traction motor and internal combustion engine are disengaged or inoperable. A key-off event does not particularly require a user to have a key, or that the user perform any function. The vehicle may autonomously key-off. A key-off event may include inoperability of one of the traction motors or combustion engines, but not both.

Now referring to FIG. 1, a system diagram of a hybrid vehicle 100 is shown. A pair of wheels 102, 104 are attached to a transmission 106. The transmission 106 couples the driveshaft to an internal combustion engine 108, traction-drive electric motor 110, and a generator 112. In some embodiments, the motor 110 and generator 112 may be unitary. The motor 110 and generator 112 are electrically connected to an electric machine bus 114. The generator 112 may serve as a current source for recharging the traction battery 116 and the auxiliary battery 128. The electric machine bus 114 may connect the traction battery 116 and plug-in charger 118, which supply power to the electric machine bus 114, to the motor 110 and generator 112. The plug-in charger 118 may serve as a current source for recharging the traction battery 116 and the auxiliary battery 128. The traction battery 116 may have high voltage and current capabilities to provide and receive an electromotive force associated with the motor 110 and generator 112. The traction battery 116 may be any battery type. For example, the traction battery 116 may be a lithium-ion battery. The plug-in charger may serve as a connection point to a utility power grid. The plug-in charger 118 may also receive power from a wireless power source. For instance, a pair of coils may be inductively coupled to provide power to the traction battery 116 and electric machine bus 114. Supply current to the electric machine bus 114 may be disconnected through a set of contactors 120.

The electric machine bus 114 may be stepped down through an adjustable direct current to direct current (DC/DC) converter 122 to power the auxiliary bus 124. The DC/DC converter 122 may be any type of stepdown converter, including a buck converter. The converter may have a variable output voltage to accommodate normal charging voltages, desulfation voltages, and destratification voltages. The DC/DC converter 122 may be unable to dampen bus transients. For example, intermittent actuation of auxiliary loads attached to the auxiliary bus 124 may cause fluctuations in the auxiliary bus 124 voltage.

The auxiliary bus 124 may have a maximum voltage of 16 volts to protect auxiliary loads 126 and the auxiliary battery 128. The DC/DC converter 122 may be controlled using the hybrid powertrain control module 136 or another control module. The hybrid powertrain control module 136 may set the bus voltage threshold for the auxiliary bus 124. The bus voltage threshold may be below the maximum voltage of the auxiliary bus 124 to provide safety margin during transients. The transients may cause the auxiliary bus voltage to fluctuate above 16 volts due to lagging voltage increases used to offset transient loads.

Safety margin bus voltage limits may reduce the low charge acceptance mitigation techniques that require raising the auxiliary bus voltage. The safety margin limits may change based on vehicle operating conditions. For example, if the vehicle is in the key-off position, the auxiliary loads 126 may be disconnected from the auxiliary bus 124 or inhibited from actuation. The key-off position may reduce the transients associated with the auxiliary bus 124, allowing the safety margin to be decreased and the bus voltage threshold to be increased. As described herein, the bus voltage threshold may be increased above a destratification or desulfation threshold to mitigate low charge acceptance.

A controller or group of controllers 132, 134, 136 may be used to control the low charge acceptance mitigation event. The controllers 132, 134, 136 may have control logic implemented therein, input channels to receive control parameters, and output channels to transmit control parameters. The input channels or input signals may be configured to receive input from numerous sources and relate to various vehicle parameters. For instance, an input channel may receive bus voltage information, charge acceptance information, or system state information. The input channels may receive networked or digital data from the CAN bus or sensory data from digital inputs or analog inputs. The input channels may be any type of informational input received by any one or all of the controllers.

The output channels or output signals may output a variety of signals. The signals may be digital or networked signals to other controllers or systems. The output channels or signals may be digital or analog outputs used to control or operate other system parameters. The control logic may be configured to receive information from the input channels and facilitate proper output at the output channels. The control logic may be stored digitally in any type of storage memory (e.g., EEPROM, ROM, RAM). The control logic may also use an arrangement of logic gates (e.g., relay logic, TTL, ladder logic). The control logic may be embedded in a single controller or grouping of controllers depending on the location of the input channels and output channels. The controllers may individually or collectively include control logic, input channels, output channels, and programming algorithms to ensure that the algorithms disclosed herein are fulfilled.

Figure 2:
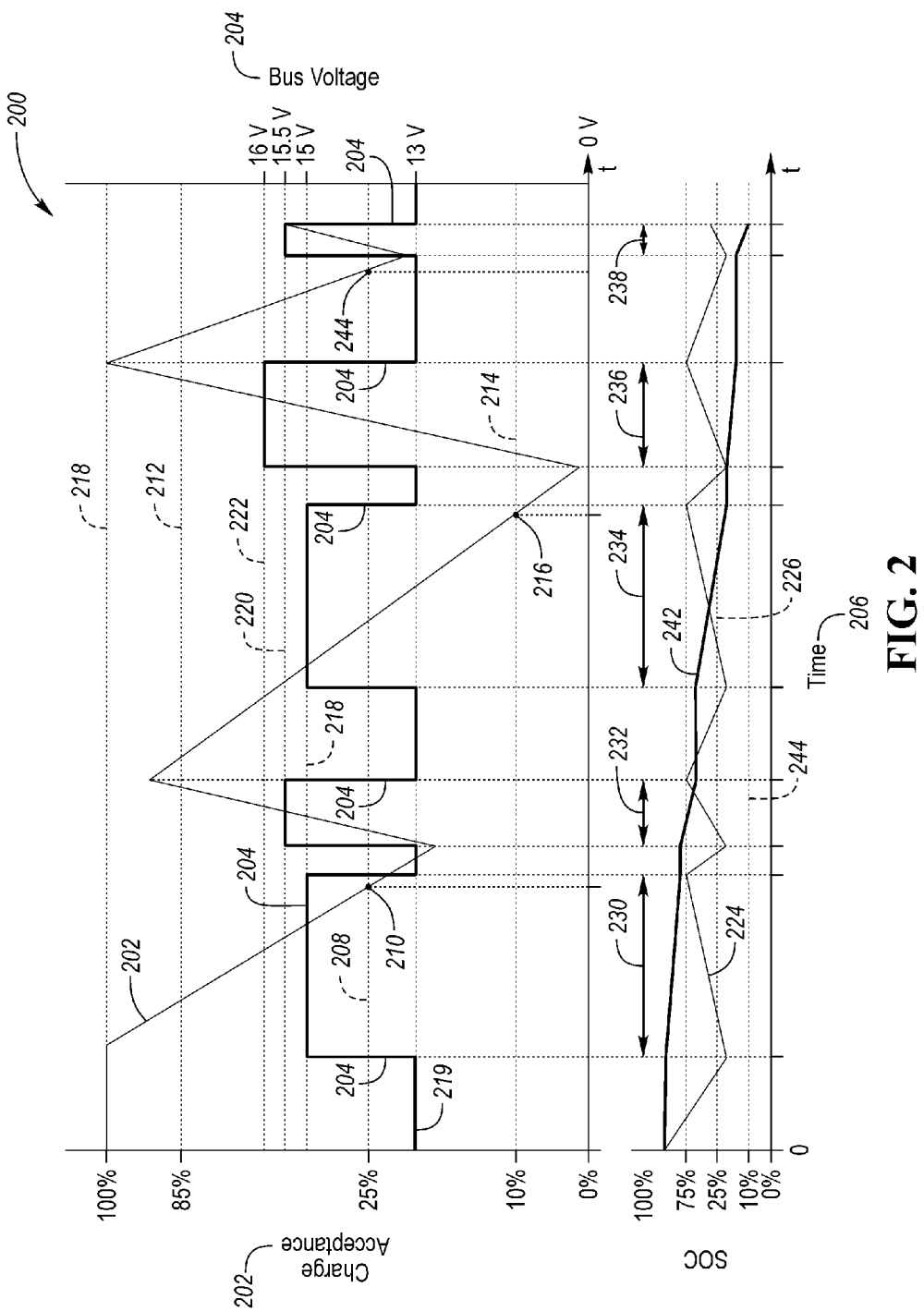
FIG. 2 is a graph depicting a low charge mitigation scheme.

Now referring to FIG. 2, a graph 200 depicting a low charge acceptance scheme is shown. The graph 200 includes a charge acceptance curve 202 having varying levels of charge acceptance. The graph 200 includes a bus voltage curve 204 with associated bus voltage thresholds 218, 219, 220, 222. The graph 200 includes a time varying battery state of charge (SOC) 224 having a charge-required threshold or an auxiliary battery state of charge threshold 226 and an auxiliary battery target state of charge or stop-charging threshold 228. The thresholds depicted in this graph may be changed, replaced, or overlap with different numerical values or names. Starting from the left, the charge acceptance 202 of the auxiliary battery is 100%. As the battery SOC 224 drops below the charge-required threshold 226, the controller may begin to charge the auxiliary battery through the DC/DC converter. The charge acceptance 202 of the auxiliary battery may begin to drop as the first charging event 230 transpires. The first charging event 230 has a normal bus voltage threshold 218. The charge acceptance 202 falls below the sulfation threshold 208, a low charge acceptance flag may be set at point 210. During the next, second charge event 232, the bus voltage 204 may be raised to a desulfation threshold 220. The desulfation threshold 220 may ensure that desulfation of the auxiliary battery occurs. The charge acceptance 202 may begin to drop below the stratification threshold 214 during the third charging event 234. A low charge acceptance flag may be set at point 216. During the next second charge event 232, the bus voltage 204 may be raised to a destratification threshold 222. During the destratification charging event, the bus voltage 204 is raised to almost 16 volts to ensure destratification occurs. During the occurrence of these charging events 230, 232, 234, 236 the traction battery SOC 242 continues to drop. During the final charging event 238, the bus voltage 204 is raised to 15.5 volts. The traction battery SOC 242 drops below an established traction battery SOC threshold or by a predetermined stored energy loss threshold 244. The traction battery SOC threshold 244 may discontinue the battery-to-battery charging event 238 regardless of the auxiliary battery SOC 224 or charge acceptance curve 202. The traction battery SOC may be adjusted to improve battery life or fuel economy. An optimal setting may be 10% SOC. The traction battery SOC threshold 244 may be equal to or related to the auxiliary battery SOC 224.

Although shown as reaching a particular charge acceptance value, the destratification or desulfation thresholds 212, 218 may have varying magnitudes to meet implementation needs, or in at least one embodiment, the destratification and desulfation thresholds 212, 218 may be the same. For example, the thresholds to enable destratification and desulfation may be different and the thresholds 212, 218 to disable destratification and desulfation may be the same or vice versa. Although shown as having a constant voltage throughout the destratification and desulfation charge events 232, 236, the bus voltage of the charging event may be adjusted as soon as the destratification or desulfation threshold 212, 218 is obtained. For example, the destratification charge acceptance threshold 218 may be reached before the battery SOC 224 has reached the charge threshold 228. The DC/DC converter controller may then reduce the bus voltage to prevent over-voltage charging of the battery. The graph 200 may not be to scale. The charging events 230, 232, 234, and 236 may have various durations and more discharge time may be typical.

Figure 3A:
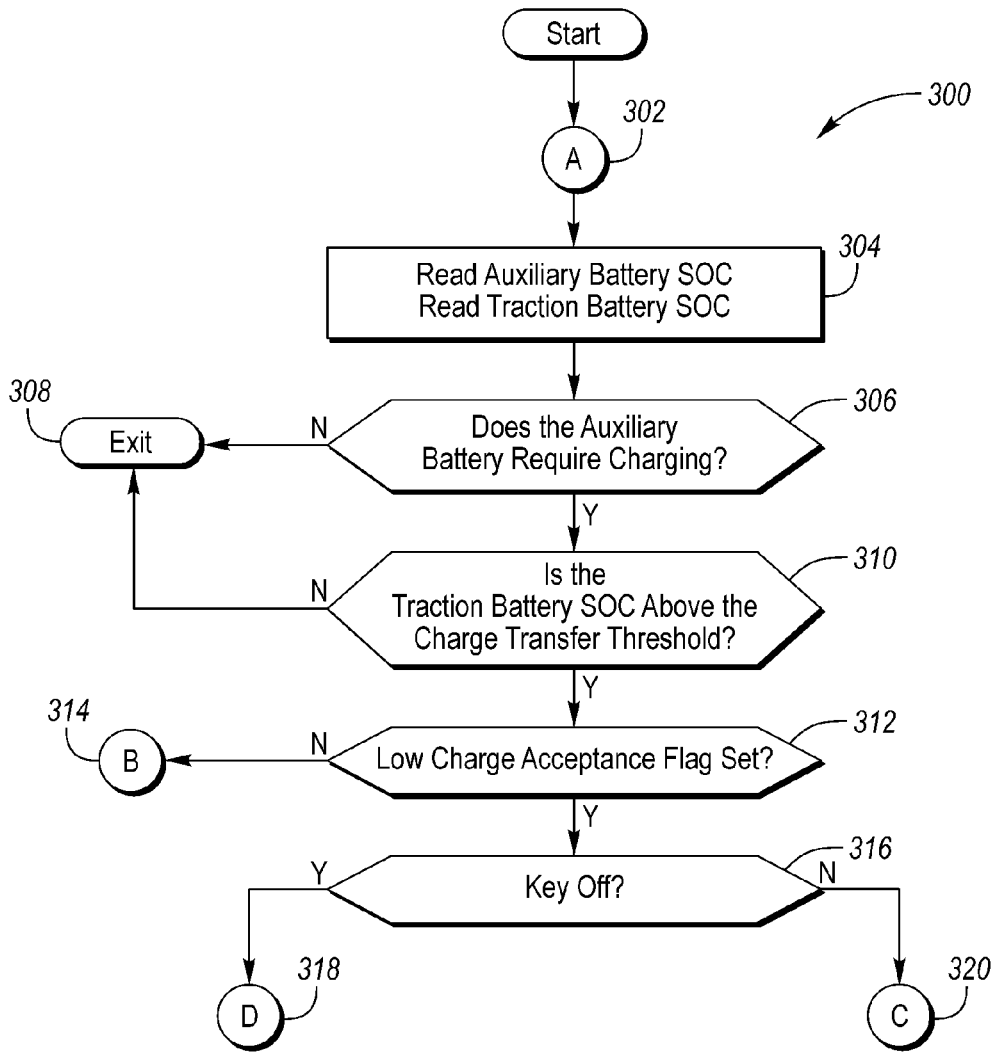
FIG. 3A is a flow diagram of a portion of a low charge acceptance mitigation scheme.

Now referring to FIG. 3A, a portion of a flow diagram 300 is depicted. In step 302, the control scheme begins with subroutine A. In step 304, the control logic may read the auxiliary battery SOC and traction battery SOC from the battery monitoring system. In step 306, the controller determines whether the auxiliary battery requires charging. The determination in step 306 may be based on an SOC of the battery. If the auxiliary battery SOC is above a recharging threshold, the algorithm exits in step 308. In step 310, if the traction battery SOC is below a recharging threshold, the algorithm exits in step 308. The algorithm may wait until the SOC of the traction battery has increased or SOC of the auxiliary battery has decreased to restart. In step 312, if the low charge acceptance flag is not set, the algorithm may proceed to subroutine B 314. If the low charge acceptance flag is set, the algorithm may proceed to another decision point in step 316. In step 316, if the vehicle is in key-off status, the algorithm may advance to subroutine D 318. If the vehicle is not in key-off status, the algorithm may advance to subroutine C 320.

Figure 3B:
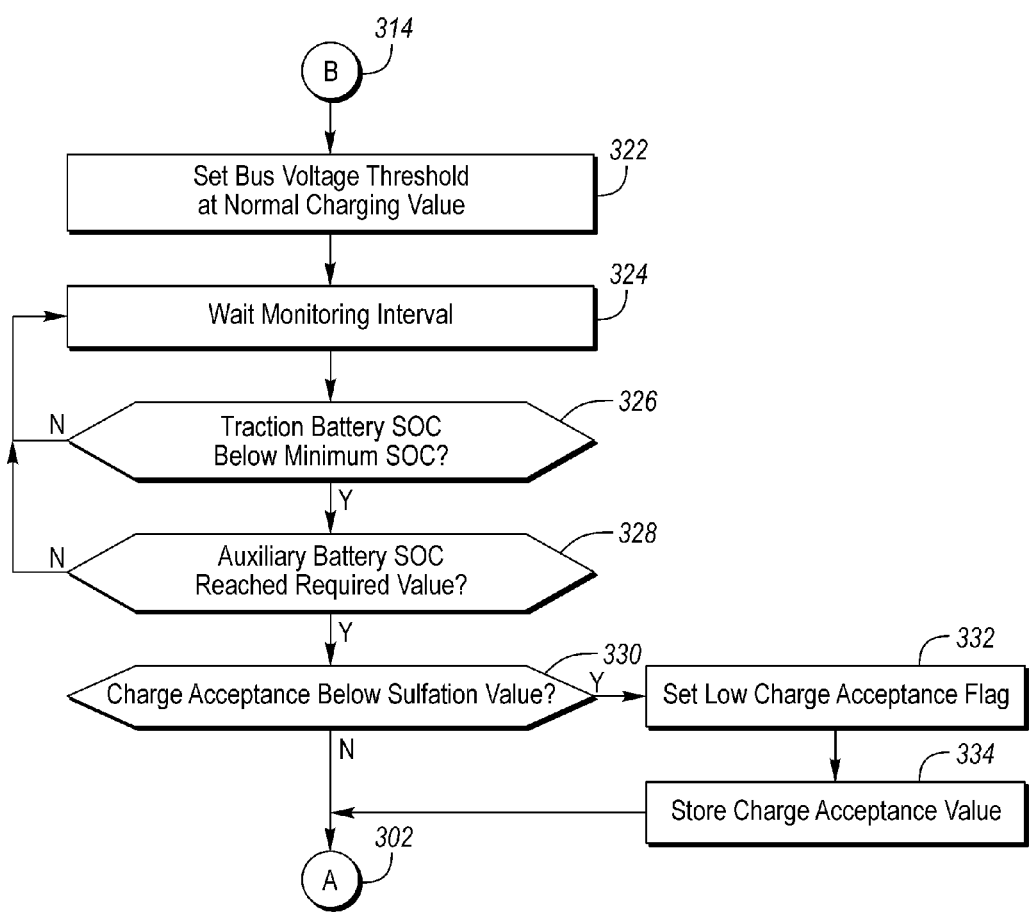
FIG. 3B is a flow diagram of a portion of a low charge acceptance mitigation scheme having a normal charging value.

Now referring to FIG. 3B, a portion of a flow diagram is depicted. Continuing from Subroutine B in step 314, in step 322 the controller may set the bus voltage threshold at a normal charging value. A normal charging value may be above the battery output voltage. For example, a 12-volt battery may have a normal recharging bus voltage threshold of 13, 14, or 15 volts. In step 324, the controller may pause or wait for a monitoring interval. In step 326, the controller checks whether the traction battery SOC is below the minimum SOC for the traction battery. If the traction battery is below the minimum SOC, the control logic may jump to the charge acceptance step of 330. If the traction battery is above the minimum SOC threshold, the control logic will continue to recharge the auxiliary battery at the normal charging voltage. In step 328, the control logic may check the battery SOC to determine whether the SOC has risen above a full charge threshold. After the battery SOC reaches the threshold, the controller performs a charge acceptance determination in step 330. The charge acceptance determination may be based on various methodologies. The charge acceptance methodology may include calculating an SOC of the battery. The SOC calculation may be based on various battery parameters (e.g., internal resistance, voltage). Coulomb counting may be used to determine the amount of current sent to the battery. Based on the ratio between applied current and battery SOC, a charge acceptance may be calculated. In step 326, a low charge acceptance determination may be performed based on a calculated charge acceptance. If the charge acceptance is below the sulfation value, a low charge acceptance flag may be set in step 332. A charge acceptance value below 50% may indicate detrimental sulfation. The sulfation charge acceptance value may be adjusted to balance battery longevity and fuel economy. The controller may store the charge acceptance value for use in step 334. The process then returns to subroutine A 302.

Figure 3C:
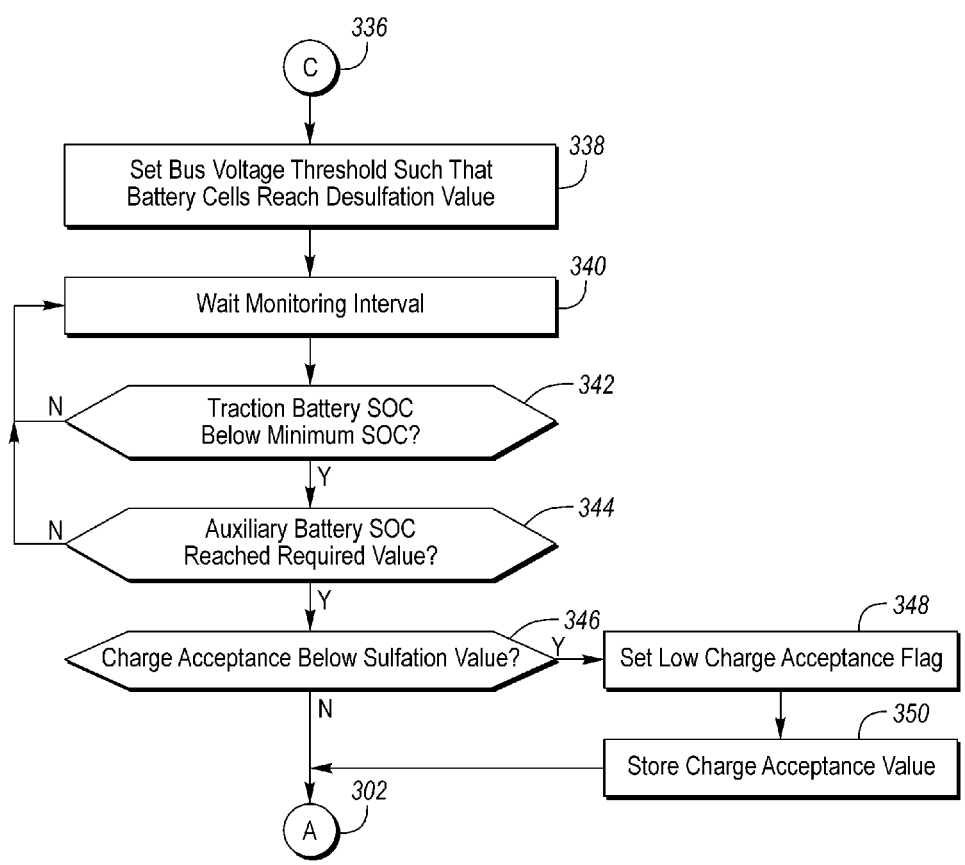
FIG. 3C is a flow diagram of a portion of a low charge acceptance mitigation scheme having a desulfation charging value.

Now referring to FIG. 3C, a portion of a flow diagram is depicted. Continuing from Subroutine C in step 336, in step 338 the controller may set the bus voltage threshold to achieve a desulfation value. For example, the required bus voltage for desulfation may be 15.5 V. In other embodiments, the desulfation bus voltage may be higher or lower. The controller may begin charging, and in step 340, the controller may pause or wait for a monitoring interval. In step 342, the controller checks whether the traction battery SOC is below the minimum SOC for the traction battery. If the traction battery is below the minimum SOC, the control logic may jump to the charge acceptance step of 344. If the traction battery is above the minimum SOC threshold, the control logic will continue to recharge the auxiliary battery at the desulfation voltage. The controller checks the battery SOC to determine whether the SOC has risen above a full charge threshold. After the battery SOC reaches the threshold, the controller performs a charge acceptance determination in step 346. As stated above, the charge acceptance determination may be based on various methodologies. Based on the charge acceptance, step 348 may be performed. If the charge acceptance is below the sulfation value, a low charge acceptance flag may be set in step 348. A charge acceptance value below 50% may indicate detrimental sulfation. The sulfation charge acceptance value may be adjusted to balance battery longevity and fuel economy. The controller may store the charge acceptance value for later use in step 350. The process then returns to subroutine A 302.

Figure 3D:
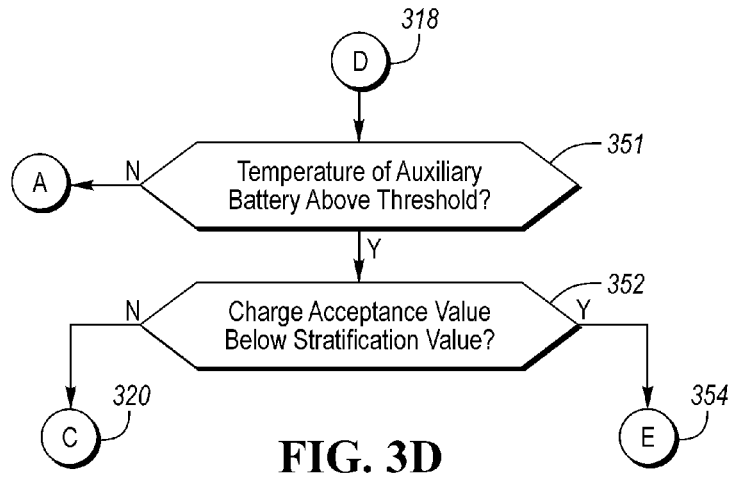
FIG. 3D is a flow diagram of a portion of a low charge acceptance mitigation scheme for a plug-in vehicle.

Now referring to FIG. 3D, a portion of a flow diagram is depicted. In step 318, the vehicle may be in a key-off state. The key-off state may have been recently achieved. The control logic may determine whether to perform a low charge acceptance mitigation. In step 351, the control logic checks the temperature of the auxiliary battery. If the auxiliary battery temperature is above a temperature threshold, the control logic moves to step 352. If the auxiliary battery temperature is below the temperature threshold, the control logic returns to Subroutine A. The control logic checks the temperature of the auxiliary to ensure that low charge acceptance mitigation will not be reduced because of the battery temperature. In step 352, if the charge acceptance is below the stratification value, in step 352, the controller may proceed to Subroutine E 354. Otherwise, the controller may proceed to subroutine C 320. The stratification value, of step 352, may equal a charge acceptance less than 1% of the rated charge acceptance. The stratification value, along with the sulfation value, may be battery dependent and circuit dependent.

Figure 3E:
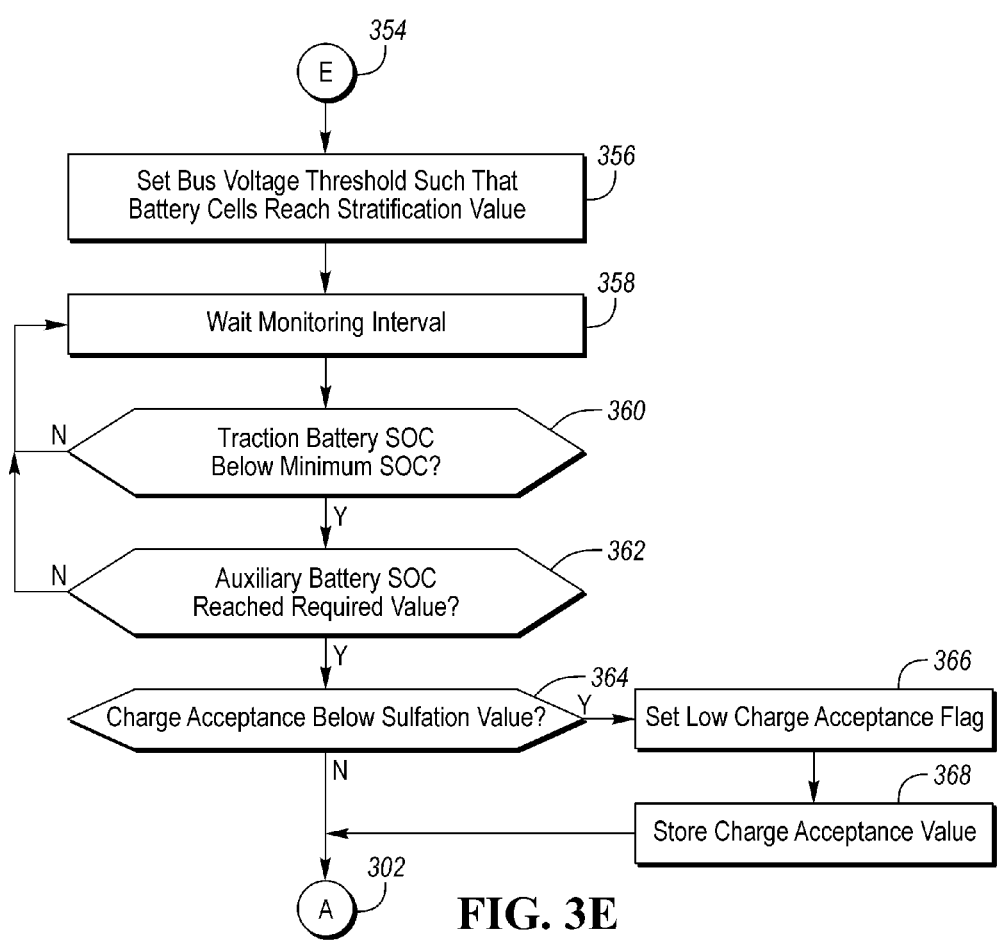
FIG. 3E is a flow diagram of a portion of a low charge acceptance mitigation scheme having a destratification charging value.

Now referring to FIG. 3E, a portion of a flow diagram is depicted. Continuing from Subroutine E in step 354, in step 356 the control logic may set the bus voltage threshold to achieve a destratification value. For example, the required bus voltage for destratification may be 15.9 V. In other embodiments, the destratification bus voltage may be higher or lower to improve battery chemistry. The controller may begin charging, and in step 358, the controller may pause or wait for a monitoring interval. In step 360, the controller checks whether the traction battery SOC is below the minimum SOC for the traction battery. If the traction battery is below the minimum SOC, the control logic may jump to the charge acceptance step of 364. If the traction battery is above the minimum SOC threshold, the control logic will continue to recharge the auxiliary battery at the destratification voltage. In step 362, the controller checks the battery SOC to determine whether the SOC has risen above a full charge threshold. After the battery SOC reaches the threshold, the controller performs a charge acceptance determination in step 364. As stated above, the charge acceptance determination may be based on various methodologies. Based on the charge acceptance, step 364 may be performed. If the charge acceptance is below the sulfation value a low charge acceptance flag may be set in step 366. A charge acceptance value below 50% may indicate detrimental sulfation. The sulfation charge acceptance value may be adjusted to balance battery longevity and fuel economy. The controller may store the charge acceptance value for later use in step 368. The process then returns to subroutine A 302.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A controller of a vehicle comprising:
   input channels configured to receive a charge acceptance value (CAV) of an auxiliary battery and a state of charge (SOC) of a traction battery;
   output channels configured to provide threshold signals to set a voltage threshold of an auxiliary bus coupled with the auxiliary battery and powered by the traction battery during a next charging event; and
   control logic configured to, in response to the CAV falling below a predetermined sulfation value and the SOC being above an SOC threshold, generate the threshold signals such that a voltage of the auxiliary battery achieves a desulfation value during the event.

2. The controller of claim 1, wherein the control logic is further configured to, in response to the CAV exceeding the predetermined sulfation value during the event, generate the threshold signals such that the voltage of the auxiliary battery falls below the desulfation value.

3. The controller of claim 2, wherein the generating is further in response to a vehicle key-off event.

4. The controller of claim 3, wherein a temperature of the auxiliary battery during the key-off event is above a temperature threshold.

5. The controller of claim 3, wherein the control logic is further configured to adjust the CAV to be temperature independent.

6. The controller of claim 3, wherein the control logic is further configured to, in response to the CAV falling below a predetermined stratification value, generate the threshold signals such that during the event a voltage of the auxiliary battery achieves a destratification value, and in response to the CAV exceeding the predetermined stratification value during the event, generate the threshold signals such that the voltage of the auxiliary battery falls below the destratification value.

7. The controller of claim 3, wherein the auxiliary battery has a state of charge falling below a state of charge threshold after the key-off event.

8. The controller of claim 7, wherein the input channels are further configured to receive a traction battery state of charge during the next charging event, and the control logic is further configured to, in response to the traction battery state of charge decreasing by more than a predetermined stored energy loss threshold, generate output signals to discontinue charging of the auxiliary battery.

9. A method comprising:
   generating voltage threshold signals such that during a next charging event, a voltage of an auxiliary battery achieves a stratification value in response to a charge acceptance value of the auxiliary battery falling below a predetermined stratification value; and
   setting a voltage threshold of an auxiliary bus, coupled with the auxiliary battery and deriving power from a traction battery, provided a state of charge of the traction battery is above a threshold.

10. The method of claim 9, wherein the generating is further in response to a vehicle key-off event.

11. The method of claim 10, wherein a temperature of the auxiliary battery during the key-off event is above a temperature threshold.

12. The method of claim 10 further comprising adjusting the charge acceptance value to be temperature independent.

13. The method of claim 10 further comprising,
    generating destratification voltage threshold signals in response to the charge acceptance value exceeding the predetermined stratification value during the event such that the voltage of the auxiliary battery falls below the stratification value;
    generating desulfation voltage threshold signals such that during the next charging event, the voltage of the auxiliary battery achieves a desulfation value in response to the charge acceptance value falling below a desulfation value and being above a destratification value; and
    lowering values associated with the voltage threshold signals such that the voltage of the auxiliary battery falls below the desulfation value in response to the charge acceptance value exceeding a predetermined sulfation value during the event.

14. The method of claim 10, wherein the auxiliary battery has a state of charge falling below a state of charge threshold after the key-off event.

15. The method of claim 14 further comprising,
    receiving a traction battery state of charge during the next charging event, and
    generating voltage threshold signals to discontinue charging of the auxiliary battery in response to the traction battery state of charge decreasing by more than a predetermined stored energy loss threshold.

16. A vehicle system comprising:
    a controller having
        input channels configured to receive a charge acceptance value (CAV) related to an auxiliary battery, and a state of charge (SOC) of a traction battery;
        output channels configured to provide threshold signals to set a voltage threshold of an auxiliary bus coupled with the auxiliary battery and deriving power from the traction battery; and
        control logic configured to,
            in response to the CAV falling below a predetermined stratification value and the SOC being above an SOC threshold, generate the threshold signals such that during a next charging event, a voltage of the auxiliary battery achieves a stratification value,
            in response to the CAV exceeding the predetermined stratification value during the event, generate the threshold signals such that the voltage of the auxiliary battery falls below the stratification value,
            in response to the CAV falling below a predetermined sulfation value and being above the predetermined stratification value, generate the threshold signals such that during a next charging event a voltage of the auxiliary battery achieves a desulfation value, and
            in response to the CAV exceeding the predetermined sulfation value during the event, generate the threshold signals such that the voltage of the auxiliary battery falls below the desulfation value.

17. The system of claim 16, wherein the setting is further in response to a vehicle key-off event.

18. The system of claim 17, wherein a temperature of the auxiliary battery during the key-off event is above a temperature threshold.

19. The system of claim 17, wherein the auxiliary battery has a state of charge falling below a state of charge threshold after the key-off event.

20. The system of claim 17, wherein the input channels are further configured to receive a traction battery state of charge during the next charging event, and the control logic is further configured to, in response to the traction battery state of charge decreasing by more than a predetermined stored energy loss threshold, generate output signals to discontinue charging of the auxiliary battery.

* * * * *